Figure 1:
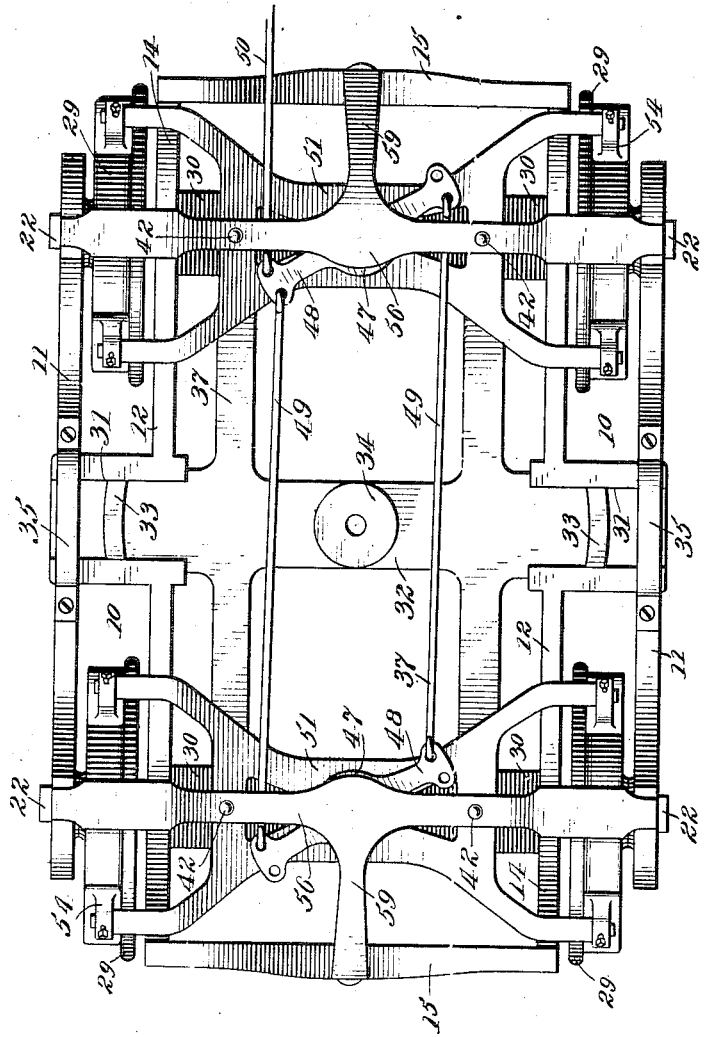

G. ROUY.
CAR TRUCK.
APPLICATION FILED MAY 20, 1910.

971,929.

Patented Oct. 4, 1910.
2 SHEETS—SHEET 1.

WITNESSES:

INVENTOR
Gustave Rouy
BY
ATTORNEYS

G. ROUY.
CAR TRUCK.
APPLICATION FILED MAY 20, 1910.

971,929.

Patented Oct. 4, 1910.

2 SHEETS—SHEET 2.

WITNESSES:

INVENTOR
Gustave Rouy
BY Munn & Co
ATTORNEYS

UNITED STATES PATENT OFFICE.

GUSTAVE ROUY, OF NEW YORK, N. Y.

CAR-TRUCK.

971,929.     Specification of Letters Patent.     Patented Oct. 4, 1910.

Application filed May 20, 1910. Serial No. 562,463.

*To all whom it may concern:*

Be it known that I, GUSTAVE ROUY, a citizen of the United States, and a resident of the city of New York, borough of Manhattan, in the county and State of New York, have invented a new and Improved Car-Truck, of which the following is a full, clear, and exact description.

This invention relates to car trucks, and constitutes an improvement upon the car truck disclosed in my United States Patent No. 764,770, of July 12, 1904, and my United States Patent No. 907,528, of December 22, 1908.
The invention has reference more particularly to a car truck which comprises pairs of spaced, longitudinal frame members, the wheels being mounted for independent rotation, between the members of the pairs, and end members connecting the inner frame members only, of said pairs, whereby the wheels can be easily removed at the ends of the frame members.

In addition, the invention relates to a car truck in which the wheels are mounted for independent rotation, and the axle spindles have a limited freedom of movement to adjust themselves transversely of the axes of rotation so that the wheels can accommodate themselves easily to curves of the track.

The invention also relates to a car truck of the kind disclosed in my patents above referred to, in which the brake beams are guided to move toward and from the wheels to insure the efficient engagement of the brake shoes with the wheel rims.

The object of the invention is to provide a simple, strong and durable car truck for railway or other cars, by means of which excessive wear of the wheels and of the rails is obviated at track curves, in which the wheels can accommodate themselves to the curvature of the track, in which the brake beams are guided to insure efficient operation, and in which the wheels can be easily removed for the purpose of replacing the same if necessary, or of repairing them.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 2:
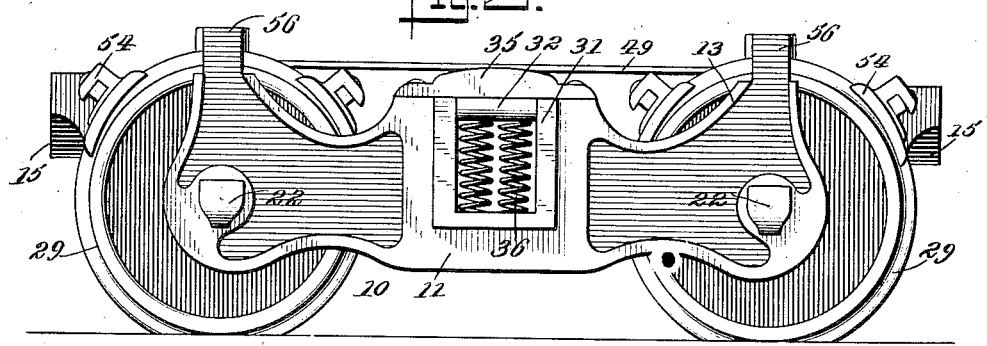
Figure 3:
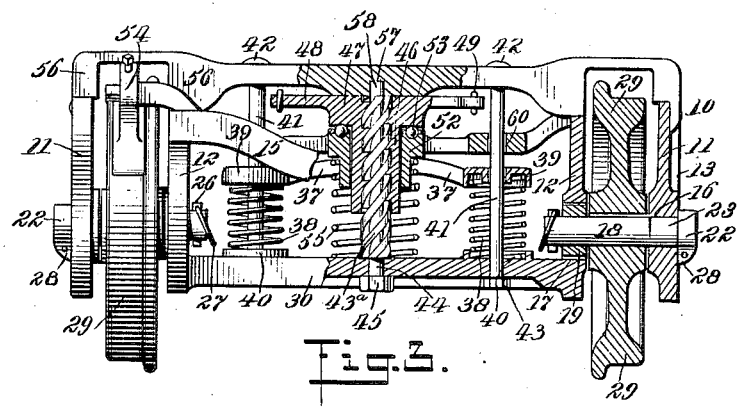
Figure 4:
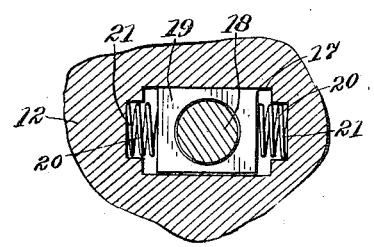
Figure 5:
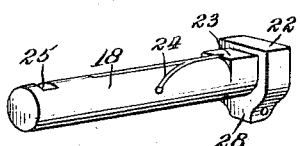

Figure 1 is a plan view of one form of my improved car truck; Fig. 2 is a side elevation of the truck; Fig. 3 is a partial, transverse section of the truck; Fig. 4 is an enlarged, fragmentary section showing part of the car truck frame and one of the axle spindles; and Fig. 5 is a perspective view of one of the axle spindles.

Before proceeding to a more detailed explanation of my invention, it should be clearly understood that the improved form of the car truck disclosed herewith is particularly useful in connection with my brake mechanism as disclosed in my prior patents. The brake mechanism comprises screw posts carried by the truck frame, suitably formed threaded members movable longitudinally of the posts when turned in one direction or the other, springs for holding the members in normal positions, brake beams controlled by the members, and carrying brake shoes adapted to engage the wheel rims when the brake beams are actuated, and brake rods for rotating the members to operate the brake beams. The screw posts are firmly mounted upon and supported by the cross frames and transoms of the truck, and the latter, at the same time, serve to brace the truck frame, carrying rigid arms connected to the end pieces of the frame, and having their extremities supported by the longitudinal frame members. I also use with the present form of the invention, the resiliently supported bolster shown in my patents, carried by the longitudinal frame members of the truck, and provided with rigid arms extending laterally, and resiliently supported upon the cross frames which form the lower supports for the screw posts. The frame of the car truck may be fashioned from separate pieces, bolted or riveted, or otherwise secured together, or certain parts of it may be formed integral, for example, by being cast in one piece.

Referring more particularly to the drawings, I employ longitudinal frame members 10, each comprising an outer wheel frame member 11, and an inner wheel frame member 12. These preferably have at the edges, strengthening ribs or flanges 13. The inner members 12 have at the ends, upwardly disposed parts 14, at the extremities of which the end pieces 15 of the frame are secured. The inner and outer wheel frame members have respectively, openings 16 and 17 which register with and receive the axle spindles 18. The openings 17 are of substantially rectangular form and receive correspondingly shaped blocks 19 in which the axle spindles are journaled. The blocks are arranged to have a limited freedom of movement laterally in the openings and are held in normal positions by means of springs 20, which seat in recesses 21 formed at the ends of the openings, and engage the sides of the blocks. Each axle spindle, at the outer end has a head 22, and adjacent thereto a portion 23 of partly angular cross section, which fits into the correspondingly shaped opening 16, and holds the axle spindle against rotation. Each axle spindle has lubricant grooves 24 and at the inner end a transverse opening 25 which receives a key 26 or like member to hold the axle spindles against displacement. Each key is provided with a ring 27, to facilitate the removal thereof. The heads 22 are of any suitable form, and preferably have ears 28, provided with openings, or otherwise formed to facilitate the withdrawal of the spindles by means of a suitable implement. The opening 16 is formed so that the spindle can rock slightly as the bearing 19 adjusts itself when the truck is rounding a curve. The opening 16, for this purpose, is preferably slightly tapered. It will be understood, that in rounding curves the automatic, resilient adjustment to the curvature of the track, of which the wheels are capable, assists in eliminating the wear of the rails and of the wheels.

As the end pieces 15 of the frame terminate at the inner wheel frames, the wheels, when the axle spindles are withdrawn, can be easily removed from between the inner and outer frames at the ends thereof. This facilitates the repair of the truck when it is necessary to remove and replace the wheels. The wheels 29 are mounted to rotate freely upon the axle spindles, and are of any preferred or common type used with car trucks.

The inner wheel frames are connected near the ends, by cross frames 30. These may be of any suitable form and as is shown for example, in the drawings, may be in the shape of inverted channels having strengthening ribs or flanges. They may be secured to the inner wheel frames by means of rivets or bolts, or may be formed integral therewith. The inner and outer wheel frames have integral sockets 31, which receive the ends of a bolster 32, by means of which the truck carries the car body in the usual fashion. At the ends of the bolster are the customary guide ribs 33, and it is provided with a central boss or hub 34. Keepers 35 extending across the open sockets, serve to secure the ends of the bolster in place. The latter is supported upon helical springs 36 arranged within the sockets, and resting upon the bottom of the same. The bolster has pairs of oppositely extending and laterally disposed arms 37, which project over the cross frames 30, and have the ends supported by helical springs 38. At the extremities of the arms are formed sockets 39 which rest upon the helical springs 38. The cross frames also have sockets 40, formed thereon, in which the springs 38 are seated. Guide rods 41, preferably in the form of bolts having heads 42, and retaining nuts 43, extend through suitable openings of the cross frames 30 and the ends of the arms 37. They are located within the springs 38 and act as guides for the arms.

Screw posts 43ª having the lower ends 44 of angular cross section, are mounted upon the cross frames 30, which have openings of angular cross section to receive the ends 44. At the under sides of the cross frames 30, the ends 44 are threaded and receive retaining nuts 45. Suitably formed threaded members 46 are arranged upon the posts, and are movable longitudinally thereof when the members are turned in one direction or the other. The members have heads 47 and laterally extended arms 48, connected by rods 49, so that they are constrained to operate together. Brake rods 50 of any preferred or common form are secured to certain of the arms, and control the operation of the threaded members. Brake beams 51, having central hubs 52 are movably mounted by means of the latter upon the members 46. The hubs 52 are provided with ball races in which are arranged ball bearings 53 engaging at the under sides of the heads 47, which are likewise provided with ball races. The brake beams have the extremities bifurcated and provided with brake shoes 54, of any preferred or common form, and adapted to engage at the rims of the wheels. Helical springs 55 are arranged about the screw posts. They are supported upon the cross frames 30, and engage at the under sides of the hubs 52 of the brake beams, and thereby tend to hold the same in normal, elevated positions.

I provide transoms 56 extending transversely of the frame, and having at the under sides, substantially central recesses 57 arranged to receive the suitably formed upper ends 58 of the screw posts to hold the same. At the ends, the transoms have downwardly disposed parts secured to the inner and outer wheel frames. The end pieces 15 of the truck frame have the centers preferably downwardly disposed, and have secured thereto the ends of the arms 59 rigid with the transoms, and downwardly inclined. The transoms have openings through them, in which are located the upper ends of the guide rods 41, the heads 42 thereof seating upon the transoms.

The brake beams have openings 60, which movably receive the guide rods, so that these serve to guide the brake beams in their movements toward and away from the wheels. The guide rods serve to prevent any lateral movement of the brake beams, and insure the efficient operation thereof.

Having thus described my invention, I claim as new, and desire to secure by Letters Patent:

1. In a car truck, pairs of longitudinal frames, wheels mounted for independent rotation between said frames of each pair, and end pieces connecting the extremities of said inner frames only, whereby said frames of said pairs are separated at the ends.

2. In a car truck, pairs of longitudinal frames, cross frames connecting said pairs, axle spindles carried by said frames of each of said pairs, wheels mounted for independent rotation upon said spindles, between said frames, and end pieces connecting the extremities of said inner frames only.

3. In a car truck, pairs of longitudinal frames having intermediate the ends, sockets, cross frames connecting said longitudinal frames at both sides of said sockets, a bolster having the ends loosely supported in said sockets, end pieces connecting said inner frames only, of said pairs, and wheels mounted for independent rotation between said frames of each of said pairs, near the ends thereof.

4. In a car truck, pairs of spaced, longitudinal frames, cross frames rigidly connecting said pairs of longitudinal frames, transoms rigidly connecting all of said longitudinal frames, and end pieces connecting the inner frames only, of said pairs.

5. In a car truck, longitudinal frame members, cross frames connecting the same, wheels journaled upon the truck, brake beams mounted for movement toward and away from said wheels, transoms connecting said longitudinal frames, and guide rods extending from said cross frames to said transoms and serving to guide the movements of said brake beams.

6. In a car truck, longitudinal frame members, cross frames connecting the same, wheels journaled upon the truck, brake beams mounted for movement toward and away from said wheels, transoms connecting said longitudinal frames, guide rods extending from said cross frames to said transoms and serving to guide the movements of said brake beams, a bolster supported by said longitudinal frames and having arms provided with openings movably receiving said guide rods, and springs carried by said cross frames, about said guide rods, and supporting the ends of said arms.

7. In a car truck, longitudinal frames, cross frames connecting the same, wheels journaled upon said longitudinal frames, transoms secured to said longitudinal frames, brake beams mounted between said cross frames and said transoms and movable toward and away from said wheels, means for actuating said brake beams, a bolster carried by said longitudinal frames and having arms extending between said cross frames and said transoms, guide rods extending from said cross frames to said transoms, said arms having openings movably receiving said guide rods, and springs between said cross frames and said arms, about said guide rods, said cross frames and said arms having sockets receiving the ends of said springs.

8. In a car truck, pairs of longitudinal frames, the outer ones of said frames having openings therethrough of angular form, the inner ones of said frames having openings therethrough of angular form, blocks movably located in said last-mentioned openings, springs tending to hold said blocks in normal positions, axle spindles supported by said blocks and in said openings of said longitudinal frames, said spindles having parts of angular form located in said openings of said outer frames, and being provided with heads at the outside of said outer frames, and wheels mounted on said spindles.

In testimony whereof I have signed my name to this specification in the presence of two subscribing witnesses.

GUSTAVE ROUY.

Witnesses:
JOHN K. BEACHVOGEL,
PHILIP D. ROLLHAUS.